US009223479B2

(12) United States Patent
Deng et al.

(10) Patent No.: US 9,223,479 B2
(45) Date of Patent: Dec. 29, 2015

(54) COMMUNICATING PLANS FOR USERS OF A SOCIAL NETWORKING SYSTEM (71) Applicant: Facebook, Inc., Menlo Park, CA (US)

(72) Inventors: Peter Deng, Mountain View, CA (US); Scott Marlette, Palo Alto, CA (US); Marcel Laverdet, Palo Alto, CA (US); Mark Zuckerberg, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 382 days.

(21) Appl. No.: 13/804,601

(22) Filed: Mar. 14, 2013

(65) Prior Publication Data

US 2013/0205225 A1 Aug. 8, 2013

Related U.S. Application Data (63) Continuation of application No. 12/080,808, filed on Apr. 2, 2008, now Pat. No. 8,887,066.

(51) Int. Cl.
*G06F 3/048* (2013.01)
*G06F 3/0484* (2013.01)
*G06Q 10/10* (2012.01)
*G06Q 50/00* (2012.01)

(52) U.S. Cl.
CPC ............ *G06F 3/0484* (2013.01); *G06Q 10/109* (2013.01); *G06Q 50/01* (2013.01)

(58) Field of Classification Search
None
See application file for complete search history.

(56) References Cited

U.S. PATENT DOCUMENTS

| 7,801,956 | B1 | 9/2010 | Cumberbatch et al. |
| 2004/0215737 | A1 | 10/2004 | Della Pasqua |
| 2005/0171955 | A1 | 8/2005 | Hull et al. |
| 2005/0227216 | A1 | 10/2005 | Gupta |
| 2006/0041460 | A1* | 2/2006 | Aaron .............................. 705/8 |
| 2006/0200374 | A1 | 9/2006 | Nelken |
| 2007/0064626 | A1 | 3/2007 | Evans |
| 2007/0233736 | A1 | 10/2007 | Xiong et al. |
| 2008/0010258 | A1 | 1/2008 | Sureka |
| 2008/0120396 | A1 | 5/2008 | Jayaram et al. |
| 2008/0126476 | A1 | 5/2008 | Nicholas et al. |
| 2008/0162510 | A1 | 7/2008 | Baio et al. |
| 2008/0300937 | A1 | 12/2008 | Allen et al. |
| 2011/0161130 | A1 | 6/2011 | Whalin et al. |

OTHER PUBLICATIONS

US Patent and Trademark Office, Non-Final Rejection, U.S. Appl. No. 13/300,979, Sep. 11, 2013, 15 Pages.

(Continued)

*Primary Examiner* — William Trapanese
(74) *Attorney, Agent, or Firm* — Fenwick & West LLP (57) ABSTRACT

Exemplary systems and methods for calendaring are provided. Exemplary systems include a natural language receiving component configured to receive a natural language entry corresponding to a future status, a calendar generation engine configured to create a calendar entry based on the natural language entry, a social network database configured for accessing and querying by the calendar generation engine, a privacy component configured to receive a privacy setting indicating a person who is approved to view the calendar entry, and a display module configured to display the calendar entry on a calendar. Exemplary methods include receiving a natural language entry corresponding to a future status, creating a calendar entry, and displaying the calendar entry.

18 Claims, 4 Drawing Sheets

(56) References Cited

OTHER PUBLICATIONS

Coombs, T. et al., "Google Power Tools Bible," Mar. 12, 2007, Chapter 26, pp. 369-382, Wiley Publishing, Inc., Indianapolis, Indiana, USA.

United States Office Action, U.S. Appl. No. 12/080,808, Dec. 19, 2013, seventeen pages.

United States Office Action, U.S. Appl. No. 13/300,979, Apr. 16, 2014, twelve pages.

United States Office Action, U.S. Appl. No. 13/300,979, Mar. 18, 2015, nine pages.

United States Office Action, U.S. Appl. No. 13/341,985, Jan. 7, 2015, seventeen pages.

\* cited by examiner

COMMUNICATING PLANS FOR USERS OF A SOCIAL NETWORKING SYSTEM

CROSS-REFERENCE TO RELATED APPLICATIONS

This application is a continuation of U.S. application Ser. No. 12/080,808, filed Apr. 2, 2008, and incorporated by reference herein in its entirety.

BACKGROUND

1. Field of the Invention

The present invention relates generally to networked digital content, and more particularly to systems and methods for calendaring.

2. Description of Related Art

Conventionally, a person who wishes to calendar or schedule an activity needs to specify multiple parameters before the activity may be entered on an electronic calendar. For example, the person may need to specify an activity and a corresponding month, day, year, start time, finish time and/or duration before the activity may be entered on a calendar. One drawback of this system is that a single parameter may have significant meaning and warrant calendaring. Additionally, conventional systems and method of calendaring do not automatically suggest or provide meaning to an entered parameter. Consequently, there is a need for systems and methods for calendaring.

SUMMARY

Exemplary methods for calendaring are provided. Such methods include receiving a natural language entry corresponding to a future status, creating a calendar entry, and displaying the calendar entry. Further methods include receiving a privacy setting indicating a person or member who is approved to view the displayed calendar entry, and/or receiving a calendar selection indicating a type of calendar to display the calendar entry.

Exemplary systems for calendaring are also provided. Such systems include a natural language receiving component configured to receive a natural language entry corresponding to a future status, a calendar generation engine configured to create a calendar entry based on the natural language entry, a social network database configured for accessing and querying by the calendar generation engine, a privacy component configured to receive a privacy setting indicating a person who is approved to view the calendar entry, and a display module configured to display the calendar entry on a calendar.

DETAILED DESCRIPTION

Exemplary systems and methods for calendaring are provided. In one instance, a user or member of a web-based social network using an exemplary calendaring system may type into the system a natural language entry corresponding to a future status. For example, the calendar user may enter a natural language entry of "going to movies tonight." Based on the received natural language entry, a calendar generation engine creates a calendar entry having a title or caption of "Movies" placed under a heading of "Tonight." A display module displays the calendar entry of "Movies" under the heading of "Tonight" on one or more of the user's calendars. Other members of the social network may view the user's calendar(s) and interact with the user's displayed calendar entries. According to further systems and methods, the user's calendar entries may be communicated to other members of the web-based social network via mechanisms such as a news feed and/or calendar feed. Based on an alternative system and method, a user may provide specifics such as an actual chronological date, time and/or duration. In a further system and method, such specifics and/or additional information may be automatically provided by a social network database and/or another database or application accessible via the web-based social network.

Figure 1:
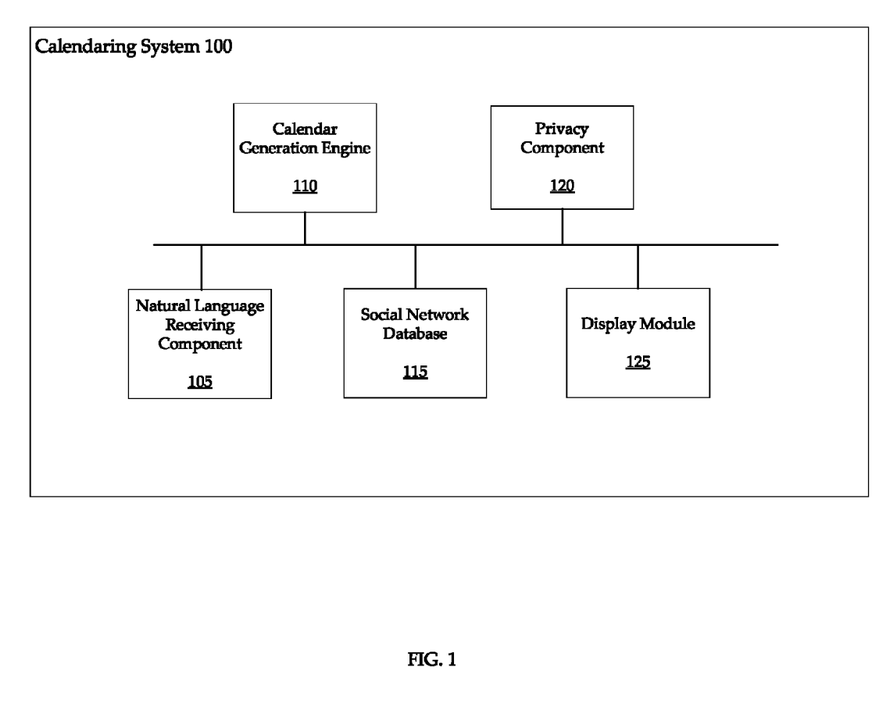
FIG. 1 is a block diagram of an exemplary architecture for a calendaring system.

FIG. 1 is a block diagram of an exemplary architecture for a calendaring system. The exemplary calendaring system 100 includes a natural language receiving component 105, a calendar generation engine 110, a social network database 115, a privacy component 120, and a display module 125.

The exemplary calendaring system 100 may form part of a computer network, including a web-based social network. The web-based social network may be accessible by computer users over a network, such as the Internet. The computer users may join or sign-up for the social network and become members of the social network. Some or all of the social network members may be users of the exemplary calendaring system 100. Further, those members that may not be users of the calendaring system may be able to view the calendars of those members who are calendar users. Computers may include desktop computers, laptop computers, mobile computers, PDAs, cell phones and most devices that have a central processing unit, a storage means, and a means for transmitting over a network.

According to one exemplary system, the natural language receiving component 105 may receive a natural language entry corresponding to a future status of a calendar user. For example, a calendar user may enter with a keyboard, mouse, stylus, touchpad, etc., a natural language entry such as "going to school today." Natural language entries may include words such as "going to," "planning to," "watching," "playing," "sleeping," "eating," "studying," "today," "tomorrow," "this evening," "next week," and/or "next month." Additionally, natural language entries may include a name of a city, a state, a geographic region and/or a country. The natural language receiving component 105 may be programmed to receive other words and thus other words may be used as natural language entries and fall within the scope of the various systems and methods described herein.

Based on one exemplary system, a calendar generation engine 110 may process a received natural language entry by creating a calendar entry, and determining a placement and/or placing the created calendar entry under a heading. For example, the calendar generation engine 110 may process the entry of "going to school today" to create a calendar entry having a title or caption of "School" and placing it under the heading of "Today" on a user's calendar. The created calendar entry may have more or less information and fall within the scope of the various systems and methods contemplated herein. Headings may include "today," "tomorrow," "this week," "this month," "this morning," "soon," "now," "this weekend," "this year," "next year," and/or similar headings. Alternatively, headings may include an actual calendar date in month/day/year format. The calendar generation engine 110 may be programmed to recognize titles, captions, entries, headings, and/or other information within a natural language entry and to create a calendar entry that it may place under an appropriate heading. For example, the calendar generation engine 110 may recognize the words "graduation" and "this weekend" in the received natural language entry of "attending my brother's graduation with Tom this weekend," to create a calendar entry titled "Graduation" under a heading of "This Weekend." In a further system and method, the calendar generation engine 110 may automatically identify the actual calendar dates corresponding to the most immediate chronological occurrence of a weekend and place the calendar entry under those calendar dates. In yet a further system and method, the calendar generation engine 110 may automatically recognize or identify "Tom" in the natural language entry as the calendar user's friend on the web-based social network and include related information about Tom in the created calendar entry.

Additionally, the calendar generation engine 110 may be programmed to recognize the first few letters of an actual calendar date within a natural language entry and automatically suggest and display one or more completed calendar dates to the calendar user. For example, a user entering the natural language entry of "going to school next Tues," may be able to view and select from "Tuesday, Feb. 26, 2008," or "Tuesday, Mar. 4, 2008," which represent immediate future occurrences of Tuesday on an actual calendar. Accordingly, the created calendar entry may be appropriately placed by the calendar generation engine 110 under the selected date. Alternatively, a user may manually specify an actual date and/or time that the calendar generation engine 110 may process to create and place a calendar entry.

According to one system, depending on such factors as the number of calendar entries displayed under a particular heading, appropriate space may be given or allocated by the calendar generation engine 110 to a particular calendar entry to be displayed, which may correspond to the duration in minutes, hours, etc., for the particular calendar entry. Alternatively, an actual time and/or duration (e.g. 4:00 pm to 6:30 pm) may be determined by the calendar generation engine 110. Such a determination may be made by the calendar generation engine 110 accessing and/or querying related data from an application and/or database accessible via the social network. For example, for the natural language entry of "going to movies tonight to see Spiderman," the calendar generation engine 110 may access a database with movie show times for Spiderman in a calendar user's geographic region. Alternatively, a user may manually specify an actual duration that the calendar generation engine 110 may process to create a calendar entry.

In various exemplary systems, a social network database 115 is in communication with the calendar generation engine 110. The social network database 115 may include information about a calendar user and other members of a web-based social network, including information about the relationships between the various members of the social network. The social network database 115 may include the names of friends, names of events, event dates, birthday dates, anniversary dates, and the like. Additionally, the social network database 115 may include data about the shared interests, activities, schools, clubs, etc., between various members of a social network. The social network database 115 may include data about the extent one member of the social network may influence the decision making of another member of the social network (e.g. an affinity weighting factor). Such information may be used to select or target calendar entries for display to other members of the social network.

According to further exemplary systems, one or more other databases and/or applications (not shown) may be accessible via a social network and in communication with the calendar generation engine 110. Such databases may be internal or external to the web-based social network. For example, an external database maintained by a rock band may communicate with a web-based social network through an interface to the web-based social network. Such a database may include information such as the dates, locations, etc., of upcoming concerts.

According to one exemplary system, when the calendar generation engine 110 processes a natural language entry to create a calendar entry, it may access and/or query the social network database 115 and/or one of the other databases accessible via the web-based social network. For example, when a calendar user enters the natural language entry of "going to school today," the calendar generation engine 110 may access and/or query an application and/or database that may include the calendar user's class schedule, syllabus, etc. The calendar generation engine 110 may use this information to suggest at least a portion of the natural language entry to the calendar user. For example, when the calendar user enters the natural language entry of "going to school today," the calendar generation engine 110 may access and/or query an application and/or database that may include the calendar user's class schedule to suggest to the calendar user "going to school today to attend Physics 101A to review Chapter 3." The calendar user may elect for the natural language receiving component 105 to receive this entry for processing by the calendar generation engine 110. Alternatively, the calendar generation engine 110 may not suggest a portion of the natural language entry, however, perform the same process of accessing and/or querying the same database to create the same calendar entry. For example, the calendar user may enter "going to school today," and the calendar generation engine 110 may automatically create the calendar entry of "going to school today to attend Physics 101A to review Chapter 3," for display on a calendar (without suggesting the "to attend Physics 101A to review Chapter 3 " portion to the calendar user).

According to some exemplary systems, the privacy component 120 may allow a calendar user to select a privacy setting indicating another person or member of the social network who may view a particular calendar entry. The privacy component 120 may receive from a calendar user a privacy setting indicating which calendars or calendar types a particular member or group of members may view. For example, a calendar user may have different privacy settings for each of their work, school, swim team, and personal calendars.

The display module 125, according to various exemplary systems, is in communication with the privacy component 120. The display module 125 may receive a calendar selection indicating a type of calendar to display a particular calendar entry. For example, a calendar user may have a public calendar, a school calendar, a work calendar, and a personal calendar in which a calendar entry may be displayed. Subject to the privacy settings entered by the calendar user into the privacy component 120, the public calendar may include those calendar entries the calendar user has selected for viewing by the widest audience on the web-based social network. The school calendar may include those calendar entries the calendar user has determined are most relevant to the calendar user's school-related activities. Likewise, the work calendar may include those calendar entries the calendar user has determined are most relevant to the calendar user's work-related activities. The personal calendar may include all of the calendar user's entries and may be available to only the calendar user.

According to one exemplary system, the display module 125 may feature settings for the calendar user to allow for some or all of the calendar user's calendar entries to be displayed on a news feed or a calendar feed that may be communicated to other members of a social network subject to the privacy settings. Further, the calendar entries of other calendar users may be displayed to the calendar user, either as part of the calendar user's news feed, calendar feed and/or superimposed on one of the calendar user's calendars. The displayed calendar entries of other calendar users may also include calendar entries originating from an application and/or a database internal or external to the web-based social network. For example, a rock band web site with an interface to a social network may wish to send concert dates to the members via transmitted calendar entries that are displayed to the members. For those calendar entries displayed to the calendar user, the calendar user may highlight or otherwise elect to have the displayed calendar entry added to the calendar user's calendar. Additionally, for those calendar entries displayed to the calendar user, the calendar user may elect to add a comment or other remark to the displayed calendar entry for viewing by the originator of the calendar entry.

In a further exemplary system and method, the display module 125 may utilize data in the social network database 115 and/or other databases or applications accessible via the social network to select or target calendar entries for display to other members of the social network. For example, the display module 125 may display one calendar user's entry for "Swim Meet" to the other members of the social network who also may be on the same swim team or may be interested in watching the swim meet. The display module 125 may utilize such factors as a calendar user's interests or geographic location to display a calendar entry created by another member of the social network or created by another entity to the calendar user for possible inclusion in their calendar. For example, the display module 125 may display to a calendar user who is interested in cars a calendar entry created by one of the calendar user's friends for a car show. The car show may or may not be taking place during a time that the calendar user has little or nothing else scheduled for that particular time. In the situation when two or more calendar entries may be displayed to a calendar user for the same or a similar time period, the display module 125 may utilize data in the social network database 115 such as data about the extent one member of the social network may influence the decision making of another member of the social network (e.g. an affinity weighting factor) to determine which entry to display to the calendar user.

Figure 2:
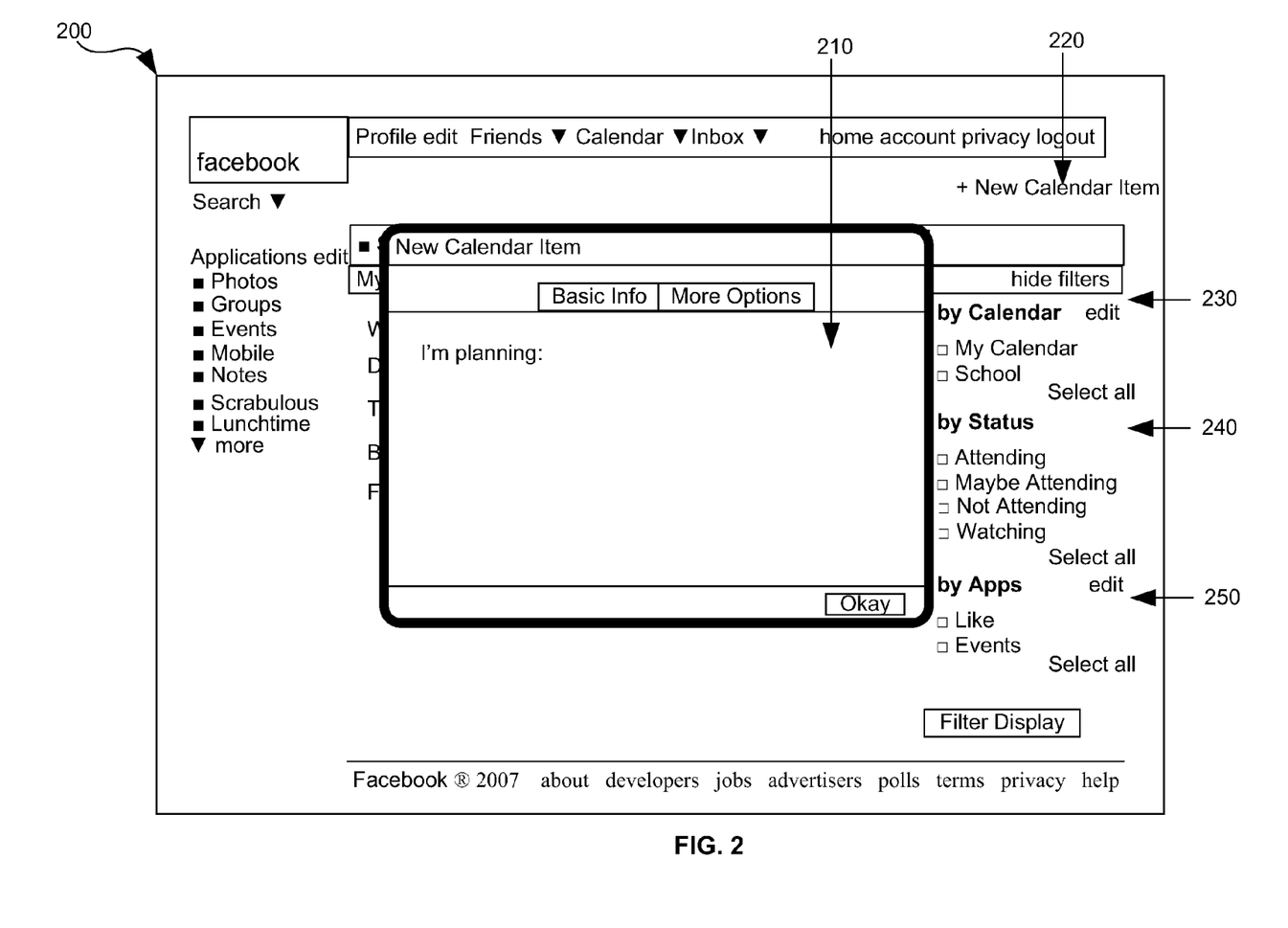
FIG. 2 is a screenshot of an exemplary natural language receiving screen.

FIG. 2 is a screenshot of an exemplary natural language receiving screen. The exemplary natural language receiving screen 200 includes natural language receiving space 210, new calendar item selection 220, calendar type selection 230, status selection 240, and application/database selection 250.

In one exemplary system, a calendar user on a web-based social network may click, double click, highlight and/or otherwise activate the new calendar item selection 220 on the natural language receiving screen 200 in order to initiate the process of entering, creating and displaying a calendar entry. Upon activating the new calendar item selection 220, the calendar user may enter a natural language entry in the natural language receiving space 210. For example, a calendar user may enter "going to football game" in the natural language receiving space 210. The calendar user may enter a selection for calendar type in the calendar type selection 230. For example, the calendar user may select "School" in the calendar type selection 230 in order to display the created calendar entry on their school calendar. Alternatively, the calendar user may select "My Calendar" in place of or in addition to the school calendar for displaying the created calendar entry. The calendar user may make a selection in the status selection 240 to indicate whether they will be attending, maybe attending, not attending, and/or watching a particular calendar entry, such as the football game. The calendar user may use the application/database selection 250 to indicate an application and/or database that may be accessed and/or queried for providing related information for the calendar entry. For example, for the natural language entry of "going to football game," an application and/or database may be accessed and/or queried to provide such information as the time, date, location, and/or opponent name with respect to the football game that may be displayed in connection with the calendar entry. Alternatively, the application/database selection 250 may suggest a calendar entry that a particular calendar user may add to one or more of their calendars. For example, a calendar entry for each occurrence of a football game for a particular team at the local field or stadium may be generated and sent by a selected application/database to a calendar user so that the calendar user may consider adding the entry to their personal calendar.

Figure 3:
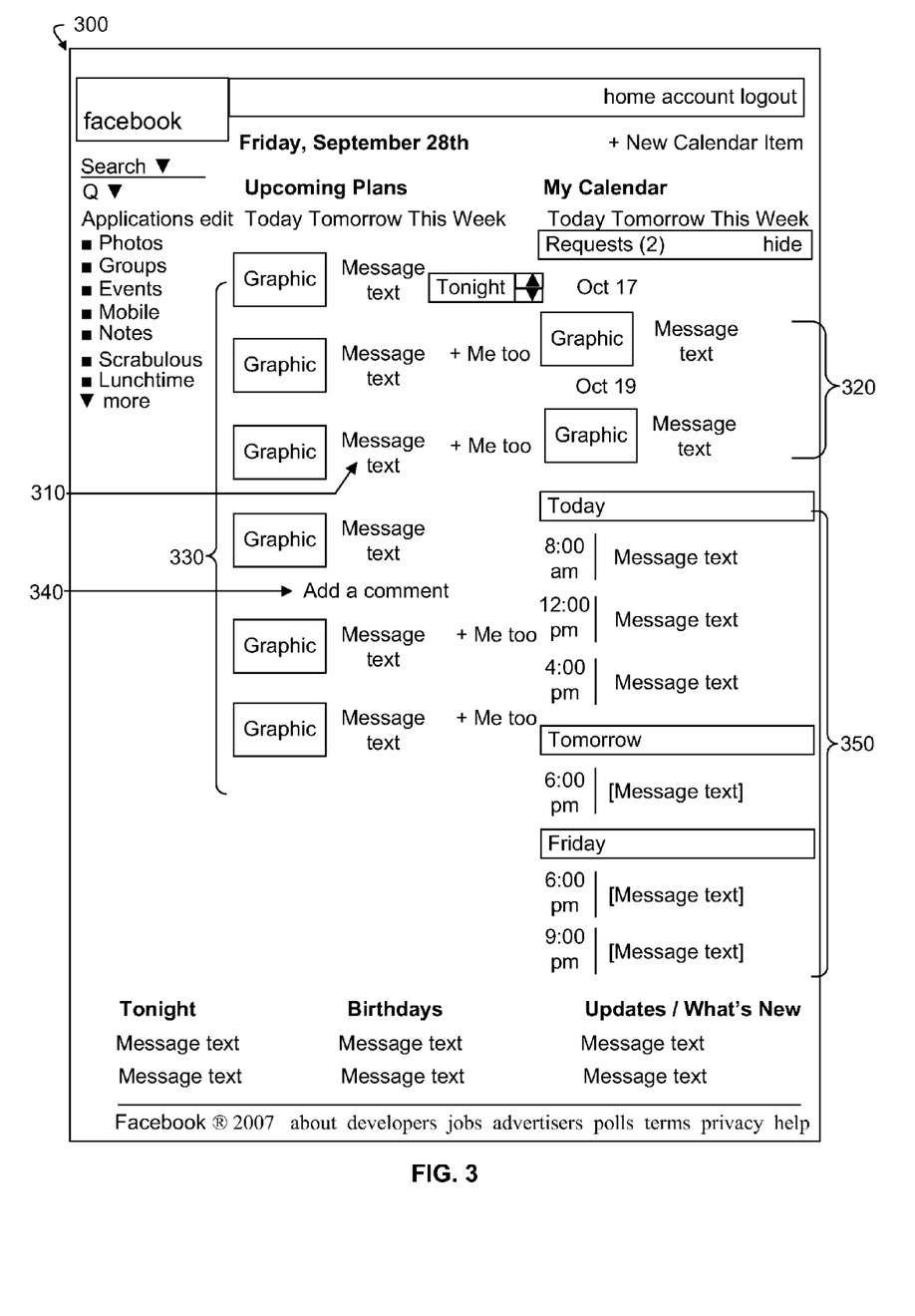
FIG. 3 is a screenshot of an exemplary calendar display screen.

FIG. 3 is a screenshot of an exemplary calendar display screen. The exemplary calendar display screen 300 includes a "Me too" selection 310, calendar requests 320, friends' calendar display 330, add comment selection 340, and personal calendar display 350. The exemplary calendar display screen 300 may display calendar entries after a natural language entry has been received and processed to create a calendar entry.

According to one exemplary system, a calendar user on a web-based social network viewing the exemplary calendar display screen 300 may see one or more calendar entries of the calendar user's friends, as shown in the friends' calendar display 330. The calendar user may click, highlight or otherwise activate the "Me too" selection 310 to add a friend's calendar entry to the calendar user's own calendar, which may then appear within the calendar user's personal calendar display 350. The friend may also receive a notification of the calendar user's action. The calendar user may use the add comment selection 340 to post a comment to the displayed calendar entry of a friend. For example, a calendar user may see that one of her friends will be running in a marathon. Accordingly, the calendar user may use the add comment selection 340 to post the comment of "Good Luck!" to the friend's displayed calendar entry. The calendar requests 320 shows requests or displayed calendar entries sent by other calendar users to the calendar user requesting that the calendar user add the sent request or calendar entry to the calendar user's personal calendar display 350.

Figure 4:
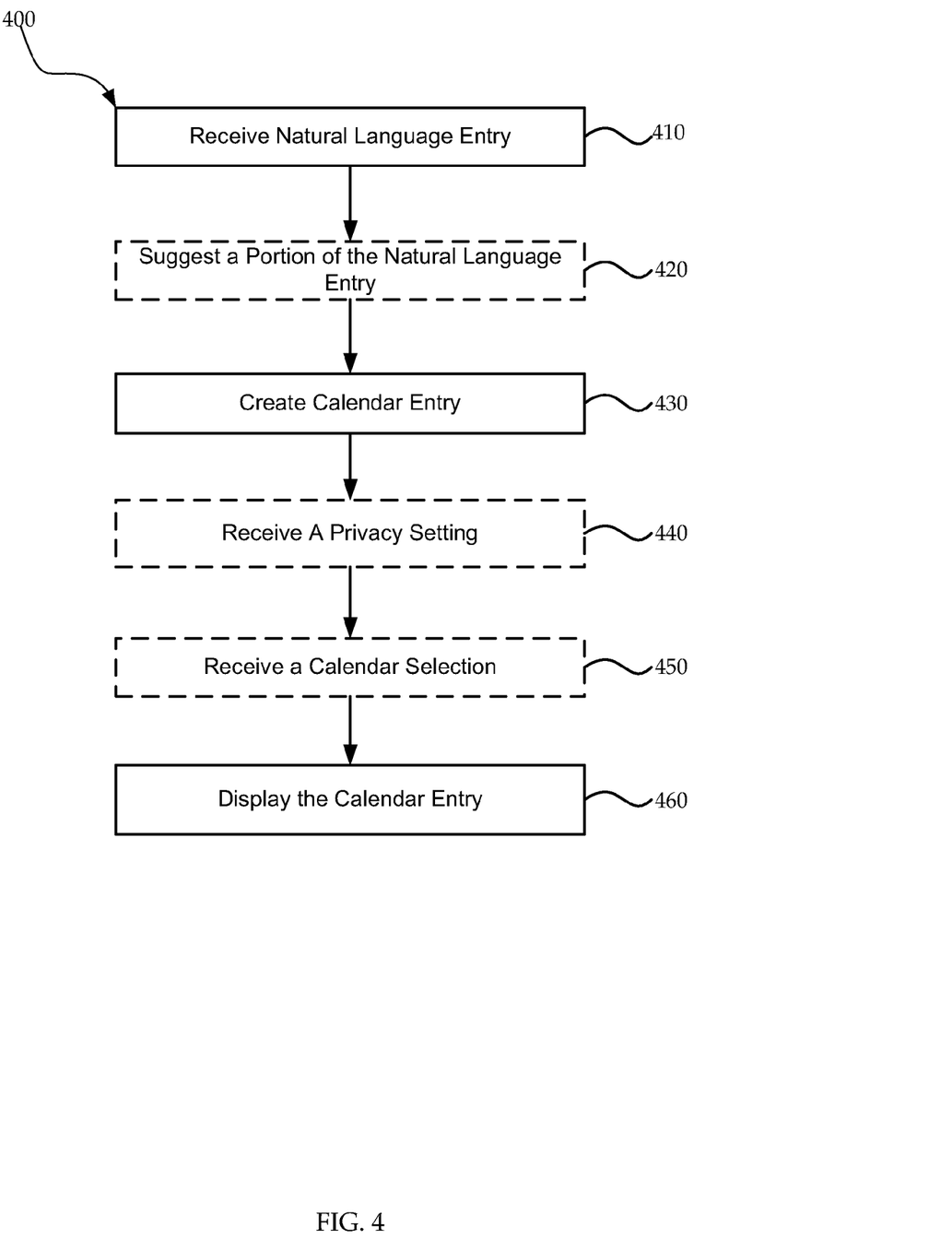
FIG. 4 is a flow chart of an exemplary method for calendaring.

FIG. 4 is a flow chart of an exemplary method 400 for calendaring.

At step 410, a natural language entry is received. For example, a member of a web-based social network who is also a calendar user may input the natural language entry of "going to football game" in the natural language receiving space 210 (FIG. 2) of a natural language receiving screen 200 (FIG. 2).

At optional step 420, a portion of the natural language entry may be suggested. For example, a calendar generation engine 110 (FIG. 1) may be programmed to recognize the first few letters of an actual calendar date within a natural language entry and automatically suggest and display one or more completed calendar dates to the calendar user. For example, a user entering the natural language entry of "going to school next Tues," may be able to view and select from "Tuesday, Feb. 26, 2008," or "Tuesday, Mar. 4, 2008," which represent the immediate future occurrences of Tuesday on an actual calendar.

At step 430, a calendar entry is created. For instance, the calendar generation engine 110 may process the natural language entry of "going to school today" to create a calendar entry for display on a calendar under the heading of "Today."

At optional step 440, a privacy setting is received. For example, the privacy component 120 (FIG. 1) may allow a calendar user to select a privacy setting indicating another person or member of the social network who may view a particular calendar entry.

At optional step 450, a calendar selection is received. For instance, the display module 125 (FIG. 1) may receive a calendar selection indicating a type of calendar to display a particular calendar entry. A calendar user may have a public calendar, a school calendar, a work calendar, and a personal calendar in which a calendar entry may be displayed.

At step 460, a calendar entry is displayed. For example, the display module 125 may feature settings for the calendar user to allow for some or all of the calendar user's calendar entries to be displayed on the personal calendar display 350 (FIG. 3).

While various systems and methods have been described above, it should be understood that they have been presented by way of example only, and not limitation. Thus, the breadth and scope of a preferred system and method should not be limited by any of the above-described exemplary systems and methods.

What is claimed is:

1. A method comprising:
    maintaining in a social networking system a plurality of connections among a plurality of users of the social networking system, the plurality of users each having an account on the social networking system that stores interests identified for each of the users;
    receiving in the social networking system an entry for a first user of the plurality of users, the received entry scheduling an event for the first user, the first user having a connection to a plurality of users in the social networking system;
    determining by the social networking system that the event is related to one or more of the interests stored in the accounts of the plurality of the users having a connection to the first user, the relation between the event and the stored interests indicating that the users may have a desire to also schedule the event on the users' own calendars; and
    providing, by the social networking system for display to each of the users having a connection to the first user and also having been determined to have one or more interests related to the event, an entry including information about the event that the users can accept to schedule the event on the users' own calendars.

2. The method of claim 1, wherein a provided entry is a calendar invitation or social invitation.

3. The method of claim 1, wherein the event is associated with a group for which the first user is a member, and wherein the provided entry is targeted to a user having a connection to the first user and being a member of the group.

4. The method of claim 1, wherein the event is related to a geographic location of a user to which an entry is provided.

5. The method of claim 1, further comprising selecting one of at least two possible entries for display as the provided entry, the at least two possible entries being calendar entries for an overlapping time period on a calendar of a user to which an entry is provided.

6. The method of claim 5, wherein the selection of one of the at least two possible entries is performed based on an affinity of the user to which an entry is provided and the first user, the affinity determined using an affinity weighting factor.

7. The method of claim 5, wherein the one of the at least two possible entries selected is the received entry of the first user, and wherein the received entry is selected based on the user to which an entry is provided having a higher affinity for the first user than for another user associated with the other of the at least two possible entries.

8. The method of claim 1, further comprising:
    generating one or more stories regarding the received entry; and
    transmitting the one or more stories for display to a news feed of a user to which an entry is provided.

9. The method of claim 1, further comprising:
    receiving, by one or more of the users having a connection to the first user and also having been determined to have one or more interests related to the event, a request to schedule the event on the user's own calendar; and
    scheduling the event on the user's own calendar in response to the request.

10. The method of claim 1, wherein the determining includes applying an affinity weighting factor to target the entry of the first user for display to the users having the connection to the first user in the social networking system based on the affinity of the users for the first user.

11. A method comprising:
    maintaining in a social networking system a plurality of connections among a plurality of users of the social networking system, the plurality of users each having an account on the social networking system that stores interests identified for each of the users;
    receiving in the social networking system an entry for a first user of the plurality of users, the received entry comprising a future status for the first user, the first user having a connection to a plurality of the users in the social networking system;
    determining by the social networking system that the received entry is related to one or more of the interests stored in the accounts of a plurality of the users having a connection to the first user, the relation between the received entry and the stored interests indicating that the users may have a desire to also schedule the received entry on the users' own calendars; and
    providing, by the social networking system for display to each of the users having a connection to the first user and also having been determined to have one or more interests related to the received entry, an invitation relating to the received entry that the users can accept to schedule the received entry on the users' own calendars.

12. The method of claim 11, wherein the invitation is a calendar invitation or social invitation.

13. The method of claim 11, wherein the invitation is for an event associated with a group for which the first user is a member, the invitation targeted to a user having a connection to the first user and being a member of the group.

14. The method of claim 11, wherein the received entry is related to a geographic location of a user to which an invitation is provided.

15. The method of claim 11, further comprising selecting one of at least two possible entries for display in the invitation, the at least two possible entries being calendar entries for an overlapping time period on a calendar of a user to which an entry is provided.

16. The method of claim 15, wherein the selection of one of the at least two possible entries is performed based on an affinity of the user to which an entry is provided and the first user, the affinity determined using an affinity weighting factor.

17. The method of claim 15, wherein the one of the at least two possible entries selected is the received entry of the first user, and wherein the received entry is selected based on the user to which an entry is provided having a higher affinity for the first user than for another user associated with the other of the at least two possible entries.

18. The method of claim 9, further comprising communicating the scheduling of the event by one or more of the users having a connection to the first user in a newsfeed to users connected to the one or more of the users having a connection to the first user.

* * * * *